United States Patent [19]

Banks

[11] E Re. 29,298

[45] Reissued July 12, 1977

[54] DEPOSITION OF VAPORIZED FLAVORANT ON TOBACCO

[75] Inventor: Jon F. Banks, Louisville, Ky.

[73] Assignee: Brown & Williamson Tobacco Corporation, Louisville, Ky.

[21] Appl. No.: 639,963

[22] Filed: Dec. 11, 1975

Related U.S. Patent Documents

Reissue of:

[64] Patent No.: 3,800,806
Issued: Apr. 2, 1974
Appl. No.: 203,206
Filed: Nov. 30, 1971

[51] Int. Cl.[2] ..... A24B 15/04

[52] U.S. Cl. ..... 131/144; 131/17 R; 131/136

[58] Field of Search ..... 131/133, 134, 135, 136, 131/138, 140 R, 144; 126/374, 348, 343.5; 34/10, 36, 37, 57

[56] References Cited

U.S. PATENT DOCUMENTS

| | | | |
|---|---|---|---|
| 1,972,118 | 9/1934 | McDill | 131/4 R UX |
| 2,007,632 | 7/1935 | Blank et al. | 131/4 R |
| 2,959,176 | 11/1960 | Dock | 131/136 X |
| 3,357,436 | 12/1967 | Wright | 131/136 X |
| 3,364,936 | 1/1968 | Axelrod | 131/144 |
| 3,548,838 | 12/1970 | Key et al. | 131/144 |
| 3,575,178 | 4/1971 | Stewart | 131/140 |
| 3,677,269 | 7/1972 | Hudson | 131/144 X |
| 3,678,939 | 7/1972 | Key et al. | 131/136 X |
| 3,693,631 | 9/1972 | Moore et al. | 131/140 P |

FOREIGN PATENT DOCUMENTS

| | | | |
|---|---|---|---|
| 2,156,357 | 12/1971 | Germany | 131/144 |
| 128,092 | 1/1973 | Norway | 131/140 P |
| 1,049,908 | 11/1966 | United Kingdom | 131/136 |
| 135,805 | 3/1961 | U.S.S.R. | 131/138 |

*Primary Examiner*—Robert W. Michell
*Assistant Examiner*—V. Millin
*Attorney, Agent, or Firm*—William J. Mason

[57] ABSTRACT

Tobacco is treated by introducing a tobacco flavorant vapor such as menthol vapor into a conduit [an] *and* pneumatically conveying the vapor through the conduit. [The air in the conduit being maintained at a temperature of from about 75° to 150° F and above the vaporizing temperature of the flavorant.] Tobacco is injected into the conduit at a point downstream from the vapor injection. The flavorant vapor is uniformly deposited on the tobacco as it is carried down the conduit. A predetermined level of flavorant is maintained in the conduit through which the tobacco and flavorant vapor are pneumatically conveyed. *The air in the conduit is maintained at a temperature of from about 75° to 150° F, which temperature is sufficient to prevent condensation of the vaporized flavorant in the conduit prior to adsorption of the flavorant on the tobacco.*

6 Claims, 1 Drawing Figure

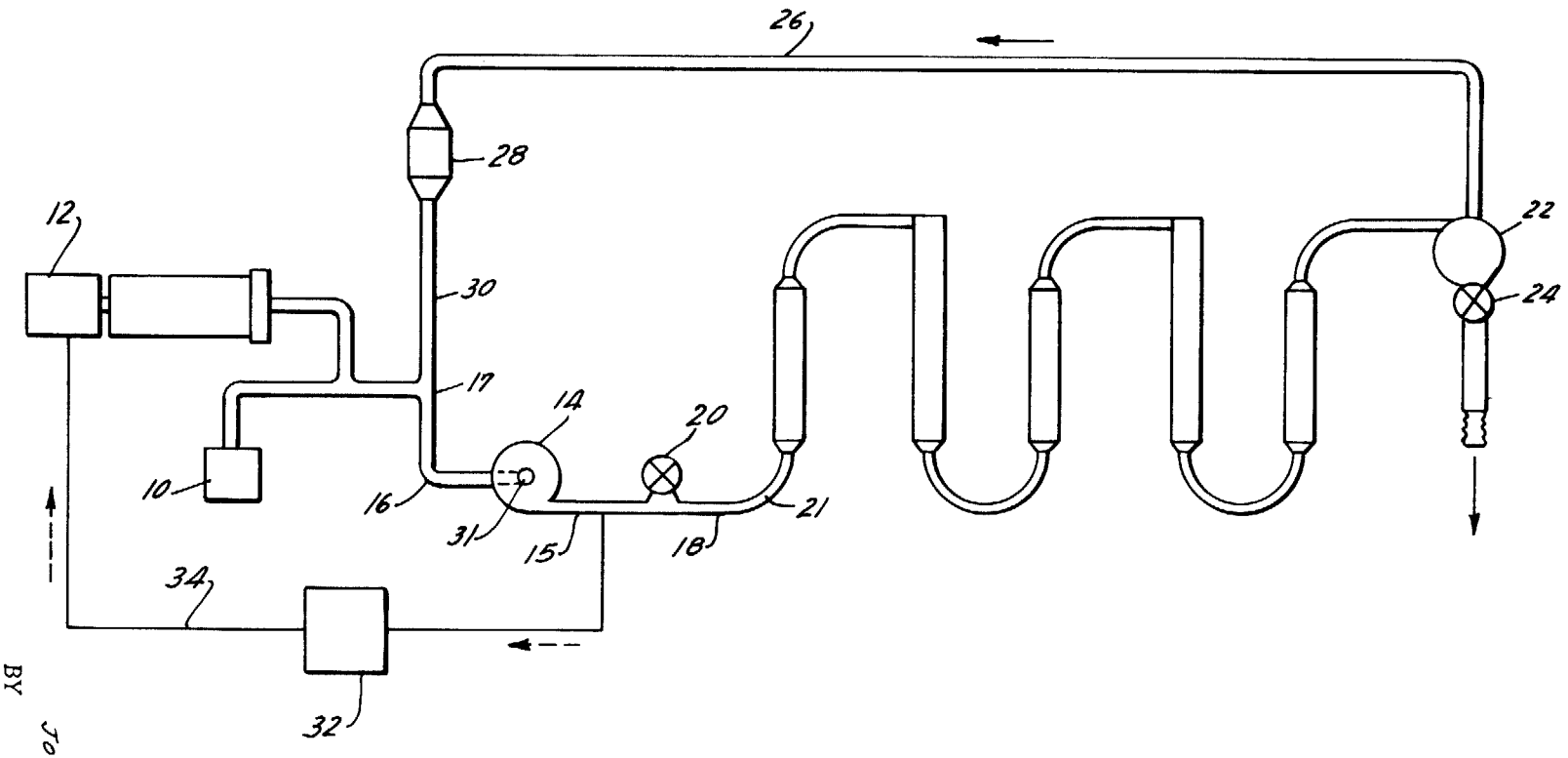
INVENTOR.
JON F. BANKS
BY
Kane, Dalsimer, Kane, Sullivan & Kurucz
ATTORNEYS

DEPOSITION OF VAPORIZED FLAVORANT ON TOBACCO

Matter enclosed in heavy brackets [ ] appears in the original patent but forms no part of this reissue specification; matter printed in italics indicates the additions made by reissue.

BACKGROUND OF THE INVENTION

The invention relates to a method for treating tobacco with volatilizable flavorants. In particular, it relates to a method for uniformly depositing menthol vapor on tobacco.

In the past the application of flavorants, including menthol, to tobacco has often been a rather haphazard operation. In general, menthol has been applied to tobacco by first forming a dilute menthol solution and thereafter spraying the solution onto tobacco. It is well known that during spraying operations, tobacco is contacted only by discrete spray droplets of menthol solution. Such droplets are not uniformly distributed over the surface of the tobacco with the result that conventional spraying operations do not, for the most part, provide uniform deposition of menthol. Only through subsequent blending and menthol transferring operations can uniform deposition be obtained.

In an attempt to remedy the aforesaid deficiencies it has been proposed to feed tobacco into a conduit where it is mixed with an air stream. The tobacco-air mixture is combined with an alcohol-menthol mixture which is sprayed onto the tobacco. This method, disclosed in U.S. Pat. No. 3,548,838, has various defects. The patent teaches that a menthol solution must be formed, preferably employing an alcohol solvent. The use of alcohol as a solvent for menthol is expensive and hazardous. As illustrated in the patent, it is necessary to vent the tobacco mentholating system to prevent the formation of an explosive concentration of alcohol vapors. The venting procedure permits a substantial loss of menthol from the system. Further, it may be necessary to permit the tobacco to stand after contact with the menthol-alcohol solution for at least 4 hours prior to use.

An additional defect of the above patent and indeed, of the prior art menthol spraying procedures, lies in the failure to control the level of menthol application during a continuous processing operation. In any direct contact spray system it is necessary to maintain matched flows of both tobacco and menthol solution. When any variations occur in either flow, off target levels for menthol application occur. No convenient method has been proposed to immediately monitoring the application of menthol on tobacco and of rapidly compensating for any variation therein. This is basically an inherent defect in the prior art processes, since spray droplets require time to spread over the surface of the tobacco. There is no convenient way of rapidly monitoring and adjusting for variations in levels of menthol application and other flavorants via the spray process.

The tobacco industry has long desired to apply menthol vapor directly to tobacco in a continuous application process. However, the industry has not been able to overcome the problems associated with such a process. In fact, U.S. Pat. No. 3,548,838 warns that it is impractical to mix menthol directly with tobacco since it is too difficult to control the very minor quantities which it is desired to use. The patent further teaches that adsorption of menthol on cut blend tobacco in a closed air recirculation system is not feasible, since, in order to provide an acceptable contentration of menthol vapor in the system, it has allegedly proven necessary to operate at extremely high temperatures, well in excess of 200° F. Such high temperatures are not conducive to tobacco processing.

Accordingly, there exists a long felt need for a process for uniformly applying menthol and other flavorants directly to tobacco without employing sprayed, dilute solutions, free of the side effects and deficiencies of the prior art.

SUMMARY OF THE INVENTION

It is, therefore, a primary object of this invention to provide a process for uniformly treating tobacco with flavorant vapors, such as menthol vapor.

It is another object of the invention to provide a process for the vapor mentholation of tobacco in the absence of a carrier fluid for the menthol.

It is an additional object of the invention to employ menthol vapor to treat tobacco at temperatures compatible with tobacco processing.

The above and other objects are attained in a method for treating tobacco comprising introducing a tobacco flavorant in vapor form into a conduit at a predetermined concentration, wherein said conduit has a pneumatic stream therein; injecting tobacco into said conduit at a point downstream from said vapor injection; permitting said tobacco and vapor to remain in contact to permit uniform adsorption of said flavorant on said tobacco; and maintaining said predetermined concentration of said vapor in at least that portion of said conduit wherein said tobacco and said vapor are in contact.

It has been discovered that flavorant and, particularly, menthol, application is unexpectedly enhanced by exposing tobacco to a pneumatic stream containing a controlled, predetermined concentration of flavorant vapor. Flavorant concentration may be maintained in the stream by sampling the pneumatic stream in the conduit in the region of contact between the tobacco and flavorant vapor and simultaneously metering into the system, flavorant vapor in proportions sufficient to replace the flavorant adsorbed by the tobacco.

The invention will be illustrated in greater detail in the accompanying drawing in which a system suitable for the performance of the invention is illustrated.

DESCRIPTION OF PREFERRED EMBODIMENTS

Although applicable to other volatizable flavorants the following discussion is primarily directed toward the vapor deposition of menthol on tobacco. Among the factors to be considered in the vapor deposition of menthol on tobacco are the following: concentration of menthol vapor in the process; contact time of menthol vapor with tobacco; temperature of the air stream in the pneumatic conduit; velocity of air in the conduit; tobacco feed rate and temperature of the tobacco, with the first three factors being of major importance. In general, the level of menthol on tobacco in conventional mentholated cigarettes is from about 0.2 to 0.5 percent by weight of tobacco. This level may be achieved by the present invention during a single pass of tobacco through the pneumatic system disclosed herein.

During mentholation of tobacco it is preferred to maintain menthol vapor concentration in the system from about 5 to 30 milligrams per cubic foot (mgm/ft$^3$) and, more preferably, from 15 to 30 mgm/ft$^3$. For best results the concentration of menthol vapor is from 20 to 28 milligrams per cubic foot. When the menthol concentration is maintained significantly below about 5 milligrams per cubic foot, it becomes necessary to employ an unacceptably long contact time with tobacco and/or an unduly elevated pneumatic stream temperature. Where concentrations of over about 30 milligrams per cubic foot are employed, the system becomes unnecessarily wasteful of menthol and, in general, requires unacceptably high temperatures to overcome the tendency of the menthol vapor to condense on the walls of the system.

In order to maintain the desired concentration of menthol vapor in the system it is preferred to employ an air temperature in the system from about 75° to 150° F. Temperatures below the lower value tend to induce condensation of menthol vapor within the system. Operating with air temperature above about 150° F tends to warm the tobacco to an undesirable level and create ultimate processing problems.

For best results it is particularly preferred to employ an air temperature from about 100° to 130° F and especially from 100° to 115° F. Above about 100° F there is a marked increase in the amount of menthol vapor adsorbed by the tobacco. By operating at temperatures no greater than about 115° F. the heating requirements for the system can be reduced with a corresponding savings in fuel consumption and insulation requirement.

In order to achieve a mentholation level of from about 0.2 to 0.5 percent by weight of tobacco during a single pass of tobacco through the system, it is preferable to achieve a contact time of tobacco and menthol vapor of about 3 to 15 seconds, preferably about 5 to 12 seconds. The tobacco-vapor contact time of 3 to 15 seconds is particularly advantageous where the concentration of menthol in the process is from 5 to 30 milligrams per cubic foot and the air temperature is from 75° to 150° F.

It has been found that the tobacco feed rate may be varied within relatively broad limits with little effect on the amount of menthol adsorbed. This feature is desirable in the process since it can be very difficult to control the feed rate of cut tobacco through a pneumatic conduit.

Usually, the air velocity within the pneumatic conduit can vary within wide ranges. As the air velocity increases, the tobacco velocity is increased, thereby decreasing the retention time of tobacco in the system. However, this factor can be counter balanced by elevating the level of menthol in the pneumatic stream.

Of course, it will be obvious to those skilled in the art that the tobacco mentholation level can be reduced or increased to achieve a particular purpose by varying the aforesaid and other parameters. Under certain circumstances it may be desirable to operate beyond one or more of the preferred ranges. In any event, the invention may be carried out by introducing a predetermined concentration of vaporized menthol into a pneumatic conduit, injecting tobacco into the conduit downstream from the menthol vapor injection point, permitting the tobacco and menthol vapor to remain in contact and maintaining the concentration of menthol vapor at least in the vapor-tobacco contacting portion of the system.

Turning now to the drawing, the process is carried out in a pneumatic system. Molten menthol is fed into a vaporizing apparatus 10 to provide a supply of menthol vapor. The molten menthol is vaporized at temperatures no greater than about 500° F in order to avoid decomposition products. The supply of molten menthol (not shown) is supplied to the vaporizer by means of pump 12.

For best results menthol vapor is introduced into the system in an area of negative or reduced pressure. Employing a reduced pressure zone to withdraw menthol vapors from the vaporizing means greatly contributes to the efficiency of the process. For the aforementioned reasons, it is preferred that the menthol vapor is introduced into the system at the negative pressure or intake side 16 of blower 14.

In order to introduce menthol vapor at the positive or outlet side 15 of blower 14 it is necessry to augment the menthol vapor with a volatile or semi-volatile carrier fluid, such as water. The carrier fluid, upon vaporization, serves to increase the total volume of vapors in vaporizing means 10, thus forcing the menthol into the system. Of course, the use of a volatile or semi-volatile fluid creates additional problems and requires subsequent removal of the fluid carrier.

Air is delivered to conduit 18 from blower 14. Cut blended tobacco is injected into the conduit downstream from the menthol vapor introduction point 17. Conventional tobacco conveying apparatus (not shown) is employed for this purpose. Tobacco may be drawn from a storage bin, delivered to a metering conveyor and thereafter conveyed into a hopper or loading chute. The tobacco is fed into a standard rotary air lock 20 which injects tobacco into the air stream in conduit 18.

The tobacco is carried along and dispersed by the air stream through the conduit. As the tobacco is injected into conduit 18, it is contacted with the pneumatically conveyed menthol vapors. The concentration of menthol vapor at this point is preferably from 5–30 mgm/ft$^3$. The tobacco-menthol vapor pneumatic stream 21 is carried into a conventional tangential separator from which the tobacco is removed by a rotary air lock 24 and collected in a storage bin (not shown).

The air stream, carrying unadsorbed menthol vapor recycles through conduit 26 to air heaters 28 where it is heated to the control temperature. The air stream then passes through conduit 30 to intake port 31 of blower 14.

In order to maintain proper control of the menthol concentration in conduit 18 a closed loop control system 32 is provided. The level of menthol vapor in conduit 18 is accurately and rapidly determined by a gas chromatograph, a total hydrocarbon analyzer, or other conventional analyzing means. The output 34 of the analyzer controls metering pump 12 which delivers molten menthol to the vaporization chamber. The accurate monitoring and control of the menthol vapor concentration is a key factor in the present process.

The process previously described is applicable to tobacco flavorants which can be vaporized without decomposition. Suitable flavorants include anethol, benzyl benzoate, cinnamaldehyde, coumarin, eugenol, heliotropin, menthone, methyl salicylate, propylene glycol, gamma-undecalactone and vanillin and the like.

Numerous advantages are achieved by the present process. More uniform control of the deposition of menthol on tobacco is achieved by vapor deposition than is achieved by spray deposition. In the present process each tobacco particle is exposed to direct contact with menthol molecules, while in the liquid spray systems conventionally employed, droplets strike tobacco at specific contact points and must migrate through the tobacco to achieve uniformity. In the preferred embodiments of the present invention no menthol carrier is employed. Obviating such a carrier represents a substantial economic benefit. Further, problems in venting dangerous volatile carriers are eliminated.

The following examples illustrate a preferred embodiment of the present invention and are not limitative of scope:

Example I

Tobacco was treated with menthol vapor in an apparatus similar to that illustrated in the drawing and described hereinabove. A heating tape was wrapped around the portion of the recycle line 26 immediately upstream of intake end 31 of the blower 14. The menthol concentration of the system was maintained at 22 milligrams per cubic foot. The temperature of air stream was maintained at 110° F. In a single run through the system the tobacco remained in contact with the menthol vapor for 3.1 seconds. The treated tobacco was analyzed for menthol. The results indicated that a menthol level of 0.35 percent by weight was achieved.

During treatment the concentration of menthol vapor was monitored employing a gas chromatograph. A peristoltic pump was operated in conjunction with the chromatograph to control the supply of molten menthol delivered to the vaporizer.

The efficiency of the present process is entirely unexpected in light of the prior art, particularly U.S. Pat. No. 3,548,838 which teaches that it is impractical to mix menthol directly with tobacco owing, in part, to the difficulty in controlling the minor quantities in use and, also, to the alleged need for employing temperatures well in excess of 200° F.

Example II

In order to determine the effect of varying the concentration of menthol vapor in the process, tobacco was mentholated according to the procedure set forth in Example I. The air temperature was 110° F. Cut tobacco was contacted with menthol vapor in the conduit of the system for 2½ seconds. Molten menthol was pumped into the vaporizer at the rate of 2.0 cubic centimeters per minute. The following table illustrates the weight percent of menthol deposited on cut tobacco as the concentration of menthol vapor in the apparatus was varied:

Menthol Analysis

| Sample | Menthol Concentration milligrams/cu.ft | Menthol on Tobacco Weight Percent |
|---|---|---|
| 1 | 9 | 0.24 |
| 2 | 12 | 0.24 |
| 3 | 18 | 0.34 |
| 4 | 21 | 0.34 |
| 5 | 25 | 0.34 |
| 6 | 27 | 0.32 |
| 7 | 33 | 0.32 |
| 8 | 37 | 0.31 |

The results obtained illustrate the enhanced deposition effects obtained when the menthol concentration is controlled within a range from about 15 to 30 milligrams per cubic foot and particularly 20 to 28 mgm/ft$^3$.

Example III

In order to illustrate the effect of air temperature on the process, tobacco was mentholated in accordance with the procedure set forth in Example I. The rates at which menthol and tobacco were fed into the process remained constant. The system temperature was controlled at points between 80° and 115° F.

From about 80° to 100° F the quantity of menthol deposited on tobacco remained substantially constant. However, at temperatures above 100° F there was a marked increase in the amount of menthol adsorbed by tobacco. It was observed that at temperatures above about 100° F there was no significant condensation of menthol on the system walls. It is postulated that maintaining a constant menthol feed while eliminating menthol condensation effectively increases the amount of menthol vapor in the pneumatic stream. The enhanced menthol application obtained is considered to be a combined effect of increasing temperature and, correspondingly, menthol concentration.

Example IV

Tobacco is treated with the following flavorants according to the procedure set forth in Example I: anethol; benzyl benzoate; cinnamaldehyde; coumarin; eugenol; heliotropin; menthone, methyl salicylate, propylene glycol; gamma-undecalactone and vanillin. The flavorants are deposited on tobacco in amounts sufficient to yield acceptable flavor.

The preferred levels of application of flavorant on tobacco is as follows for each of the flavorants employed — the levels of application are expressed in weight percent of tobacco:

| Flavorant | Level of Application |
|---|---|
| anethol | 0.0005–0.02 |
| benzyl benzoate | 0.0005–0.01 |
| cinnamaldehyde | 0.0002–0.005 |
| coumarin | 0.0005–0.005 |
| eugenol | 0.0005–0.01 |
| heliotropin | 0.0005–0.015 |
| menthone | 0.01–0.05 |
| methylsalicylate | 0.0005–0.01 |
| propylene glycol | 0.01–2.0 |
| γ-undecalactone | 0.0002–0.005 |
| vanillin | 0.0002–0.005 |

For reasons of economy there is a practical limit to the amount of additive which is usually applied by vapor deposition. The upper limit is proportional to the vapor pressure of the specific additive.

I claim:

1. A method of treating tobacco comprising:

a. introducing by vapor injection a tobacco flavorant in heated vapor form in the absence of a volatile or semi-volatile carrier fluid, into a conduit having a heated air stream maintained at a temperature within the range of from about 75° to 150° F, the temperature of said air stream being [above the vaporizing temperature of the flavorant] *maintained at a level sufficient to prevent condensation of said vaporized flavorant in said conduit prior to adsorption of said flavorant on the tobacco*, the vaporized flavorant being a material selected from the group consisting of menthol, anethol, benzyl [; ]

benzoate, cinnamaldehyde, coumarin, eugenol, heliotropin, menthone, methyl salicylate, propylene glycol, gamma-undecalactone and vanillin, a proportion of from [15] *5* to 30 milligrams per cubic foot of heated air to form a uniform concentration of said vaporized flavorant in said air stream;

b. injecting tobacco into said conduit and into said mixture of said heated air and vaporized flavorant at a point downstream from said vapor injection at the outlet side of a negative pressure producing means;

c. keeping said tobacco and vaporized flavorant in said conduit in contact for a period of time of [ from ] between 3 and 15 seconds to permit uniform adsorption of said flavorant whereby a flavorant level [of at least about 0.2 percent] on said tobacco is obtained; and finally separating the flavored tobacco from said conduit.

2. The invention in accordance with claim 1 wherein the vapor is menthol vapor and the concentration of menthol vapor in said conduit at said tobacco injection point is from [about 5] *15* to 30 milligrams per cubic foot *of heated air and said flavorant level of menthol obtained on said tobacco is at least 0.2 percent by weight of tobacco.*

3. The invention in accordance with claim 1 including the steps of separating the [ menthol-treated ] *flavorant-treated* tobacco from said air stream, thereafter, recycling said separated air stream to said conduit.

4. A method of treating tobacco comprising:

a. introducing by vapor injection menthol in heated vapor form in the absence of a volatile or semi-volatile carrier fluid into a conduit having a heated air stream maintained at a temperature within the range of from [about] 75° to 150° F, the temperature of said air stream being [above the vaporizing temperature of said menthol] *maintained at a level sufficient to prevent condensation of said vaporized flavorant in said conduit prior to adsorption of said menthol on the tobacco*, a vaporized menthol being in the proportion of from between 15 to 30 milligrams per cubic foot of heated air to form a uniform concentration of said menthol in said air stream;

b. injecting tobacco into said conduit and into said mixture of said heated air and vaporized menthol at a point downstream from said vapor injection at the outlet side of a negative pressure producing means;

c. keeping said tobacco and vaporized menthol in said conduit in contact for a period of time of [from] between 3 and 15 seconds to permit uniform adsorption of said menthol at a menthol level of at least [about] 0.2 percent on said tobacco; and finally separating the flavored tobacco from said conduit.

5. The invention in accordance with claim 4 including the steps of separating the menthol-treated tobacco from said air stream and thereafter recycling said air stream to said conduit.

6. The method in accordance with claim 4 in which the temperature of [the pneumatic] *said heated air* stream is between 100° and 115° F.

* * * * *